(12) United States Patent
Kunert et al.

(10) Patent No.: US 6,374,589 B1
(45) Date of Patent: Apr. 23, 2002

(54) ENERGY SUPPLY CHAIN

(75) Inventors: Carsten Kunert, Monheim; Andreas Hermey, Haan; Guenter Blase, Bergisch Gladbach, all of (DE)

(73) Assignee: Igus Spritzgussteile fur die Industrie GmbH, Cologne (DE)

( * ) Notice: Subject to any disclaimer, the term of this patent is extended or adjusted under 35 U.S.C. 154(b) by 5 days.

(21) Appl. No.: 09/610,265

(22) Filed: Jul. 6, 2000

(30) Foreign Application Priority Data

Jul. 30, 1999 (DE) .......................... 299 13 063

(51) Int. Cl.⁷ ................................. F16G 13/00
(52) U.S. Cl. .......................... 59/78.1; 249/49
(58) Field of Search ................. 59/78, 78.1; 248/49

(56) References Cited

U.S. PATENT DOCUMENTS

| | | | | |
|---|---|---|---|---|
| 1,276,117 A | * | 8/1918 | Riebe .................. | 59/78.1 |
| 3,197,954 A | * | 8/1965 | Merker et al. ........ | 59/78.1 |
| 4,392,344 A | | 7/1983 | Gordon et al. ....... | 59/78.1 |
| 4,840,023 A | * | 6/1989 | Borsani ............... | 59/78.1 |
| 4,944,687 A | | 7/1990 | Mailly et al. ......... | 439/207 |
| 5,970,701 A | * | 10/1999 | Roden et al. ........ | 59/78.1 |
| 6,161,373 A | * | 12/2000 | Heidrich et al. ..... | 59/78.1 |

FOREIGN PATENT DOCUMENTS

| | | |
|---|---|---|
| DE | 1 574 369 | 1/1964 |
| DE | 1 675 330 | 2/1968 |
| DE | 34 19 877 | 5/1984 |
| DE | 41 05 650 | 2/1991 |
| DE | 43 02 757 | 3/1994 |
| DE | 197 52 377 | 5/1999 |

* cited by examiner

*Primary Examiner*—David Jones
(74) *Attorney, Agent, or Firm*—Drinker Biddle & Reath LLP

(57) ABSTRACT

An energy supply chain for guiding conduits such as cables, hoses or the like between a stationary and a movable connection point or between two connection points which are movable relative to each other comprises a plurality of hingedly interconnected chain link members forming a space for receiving the conduits extending therethrough. The chain includes at least one bar which is resilient about its longitudinal axis and which extends in the longitudinal direction of the chain, more particularly in the receiving space thereof. Upon pivotal movement of the chain link members relative to each other the bar produces return forces which oppose the pivotal movement.

11 Claims, 5 Drawing Sheets

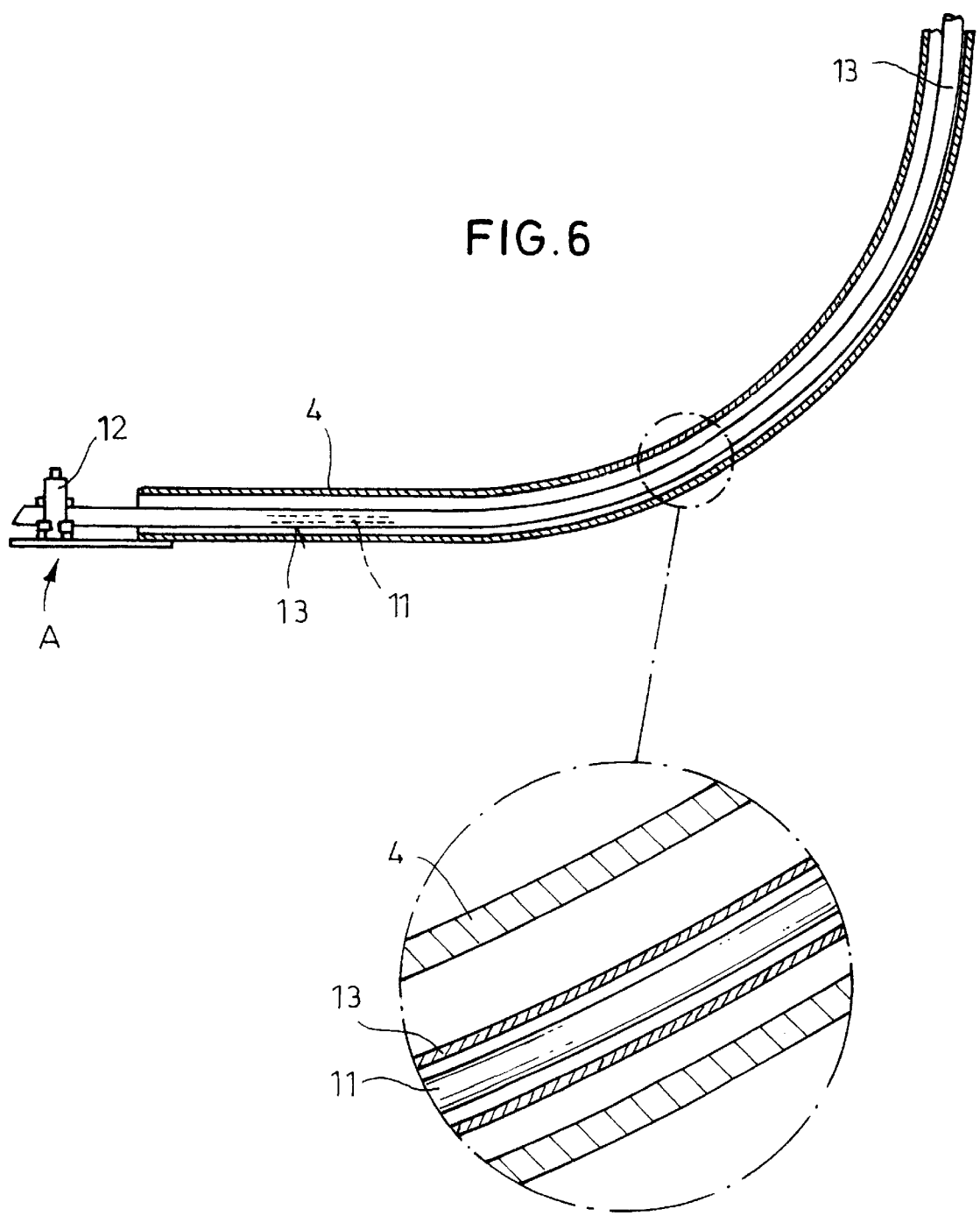

ENERGY SUPPLY CHAIN

FIELD OF THE INVENTION

The invention concerns an energy supply chain, more specifically for example an energy supply chain for guiding at least one conduit such as a cable, hose or the like between a stationary and a movable connection location or between first and second connection locations which are movable relative to each other.

It may be noted at this point that a typical area of use of such an energy supply chain is as a guide means for guiding conduits, hoses and/or cables for the external supply of application installations such as gripping arms, welding tongs, spray guns and the like on robot arms having a plurality of degrees of rotational and/or pivotal freedom.

BACKGROUND OF THE INVENTION

The task of guiding conduits such as hoses and/or cables for carrying energy for example in the form of power, water, compressed air or hydraulic fluid for the external supply of application installations on robot arms has hitherto been implemented by corrugated flexible polyurethane tubes which are equipped in various different ways. In this respect the term application installation is used to denote for example gripper arms, welding tongs, spray guns or the like which are disposed at the distal ends of the robot arms. In regard to such installations, the supply hoses and cables or conduits are passed and fixed outside cavities which are formed within the robot arms themselves. As it is known that robot arms have a plurality of degrees of rotational and/or pivotal freedom, the guide means for the supply conduits, in other words the above-mentioned guide tubes or hoses, must also be capable of implementing a plurality of pivotal and torsional movements. The radii of curvature of the guide tubes or hoses must be such that changes in length between the application installation at the distal end of a robot arm and a connection point, for example at the base of the robot arm, can be compensated. The radii of the cable or hose guide means which is laid on the robot arm, in the form of the flexible polyurethane tube or hose, are so selected that they themselves form a reserve or buffer for accommodating variations in length in that way, and they thus form a length-compensating configuration between the connection point for example at the base of the robot arm and the application installation at the robot arm distal end. When however there is a very short distance between the application installation and the connection point, being a situation in which the maximum lengthwise portion of the guide tube has to be accommodated in the length-compensation buffer, the excessive radii of the guide tubes or hoses have a tendency to hang down. Such sagging of the guide tubes or hoses should be avoided as far as possible as that downwardly hanging configuration of the guide tube or hose can have an adverse effect on the freedom of movement of the robot arm.

In order to obviate this problem, the portions of the guide tube or hose which are operative to form radii therein can be arranged in coil springs or spring turns which afford to the radius in question a certain degree of rigidity which opposes such sagging of the guide tubes or hoses.

The guide tube or hose may also be held in guide sleeves which are fixed on spring supports. The spring supports also act in opposition to sagging of the guide tube or hose in the radius of curvature in question.

Both of the above-described configurations for stabilising the radii of the guide tubes or hoses however suffer from the disadvantage that, depending on the flexural and torsional loading on the guide tube or hose, the latter, in the stabilised region, deflects in a completely uncontrolled fashion in the direction of the lowest level of resistance to flexural or torsional forces. That gives rise to completely uncontrolled loadings in the guide tube or hose while some situations also involve resistances to movement, which hinder movement of the robot arm in the prescribed direction.

Finally, the use of guide tubes involves the disadvantage that they can exceed the maximum amount of bending or the maximum flexural loading, which is acceptable in regard to the supply conduits contained therein. Particularly in the case of uncontrolled deflection or bulging of the guide tubes or hoses in the region of the stabilised radii thereof, both the guide tubes or hoses and also the internal components therein may suffer from unacceptable kinking or folding loadings.

SUMMARY OF THE INVENTION

An object of the present invention is to provide an energy supply chain for guiding conduits such as cables, hoses or the like, of a simplified structure and capable of stabilising flexural radii, without suffering from the disadvantages referred to above of the prior arrangements.

Another object of the present invention is to provide an energy supply chain for cables, hoses or the like conduits of a simple and operationally reliable structure for serving as a guide means for the external supply of components on a robot arm having a plurality of degrees of rotational and/or pivotal freedom.

Still another object of the present invention is to provide an energy supply chain for guiding at least one conduit between first and second connection locations of which at least one is movable relative to the other, which is of a simplified and easily assemblable structure with a low level of susceptibility to faults while allowing smooth pivotal and sliding movement in operation thereof.

In accordance with the principles of the present invention the foregoing and other objects are attained by an energy guide chain for guiding at least one conduit such as a cable or hose between first and second connection locations of which at least one is movable relative to the other, for example a stationary and a movable connection location, for example to act as a guide means for guiding a hose and/or a cable for external supply to a component on a robot arm having a plurality of degrees of rotational and/or pivotal freedom, comprising a plurality of chain link members with means pivotably interconnecting the chain link members to form the elongate chain. The chain link members form a receiving space for the conduit to extend therein. The chain further includes at least one elongate bar which is resilient about its longitudinal axis and which extends in the longitudinal direction of the chain in the receiving space thereof and which upon pivotal movement of the chain link members relative to each other produces return forces opposing the pivotal movement.

In a preferred feature of the invention the bar of at least some chain link members is arranged displaceably in the longitudinal direction upon curvature of the energy supply chain so that any pivotal or curvature radii can be implemented in a simple manner without being adversely affected by the bar which forms a stabilisation element for the chain. With increasing flexing thereof, the bar generates return forces which seek to cause the energy supply chain to move into a straight condition.

In order to counteract uncontrolled deflection movements of the energy supply chain when pivotal movements thereof are effected, the energy supply chain preferably includes first and second bars, for example of glass fiber, which extend at least over a part of the length of the chain. In a preferred feature, those bars extend only in the region of the radii where a stabilisation effect is required, in which respect the portion of the chain which is to be stabilised can advantageously be suitably adjusted by altering the length of the bars. The use of first and second bars affords the advantage that the return forces generated thereby can be applied symmetrically to the chain, thereby also at least substantially obviating uncontrolled deflection movements of the chain. In quite general terms an energy supply chain which is comparatively stiff in comparison with a polyurethane tube or hose already resists uncontrolled deflection movement by virtue of spring forces which are applied thereto.

In a further preferred feature of the invention the bar or bars is or are each arranged in a respective guide tube or hose so that a sliding movement or a relative movement of the bars when a plurality thereof is present is possible upon flexing of the energy supply chain in respect of a part of the flexural radius thereof without frictional effects or edges in the interior of the chain having an adverse effect. Preferably, the at least one bar is fixed outside the energy supply chain or to an end fixing portion of the chain, at an end thereof, for example by means of a suitable clamping clip.

The guide tube or tubes desirably extend between the connection locations of the chain.

With that design configuration, the bar or bars can be easily interchanged and replaced by other bars of different thicknesses affording different return forces. The operative length of the spring configuration produced by the bars can be easily adjusted by withdrawing the bars. Finally the bars can also be replaced in that way without the energy supply chain or the conduits, cables or hoses or the like guided therein having to be disconnected at the connection locations.

In accordance with a particularly preferred feature of the energy supply chain according to the invention at least in a portion-wise manner a plurality of mutually adjacent chain link members have relative to each other first and second degrees of pivotal freedom, the pivot axes thereof preferably being oriented displaced through 90° relative to each other, while the chain link members have at least in the region through which the at least one bar passes only one respective degree of pivotal freedom relative to each other, which is in the respective same direction, so that in this way also it is possible to at least substantially avoid unacceptable and uncontrolled deflection of the energy supply chain at the respective flexing radius in a direction which cannot be foreseen.

An energy supply chain of a similar configuration can be found for example in DE 43 02 757 C1 to which reference is directed here. Such an energy supply chain has in a portionwise manner two degrees of freedom, in respect of rotation of a plurality of mutually adjacent elements or chain link members, wherein each second element is arranged turned through 90° about the longitudinal axis of the cable guide configuration formed in that way, so that three elements are connected together in a semi-cardanic manner and the energy supply chain has in a portion-wise fashion overall three degrees of pivotal or rotational freedom. Such an energy supply chain is particularly suitable for implementing the movements to be performed by a robot arm, in which respect advantageously the region of the radii to be stabilised for the energy supply chain obviously has only one degree of pivotal freedom of the chain link members relative to each other.

In a further preferred feature of the invention the chain link members are each in the form of an element with a closed external contour and a closed external surface so that they form a very substantially closed passage as the receiving space for the conduit. In accordance with a preferred feature the energy supply chain can be formed by chain link members of thermoplastic material.

Further objects, features and advantages of the invention will be apparent from the description hereinafter of a preferred embodiment thereof.

BRIEF DESCRIPTION OF THE DRAWING

FIG. 6 is a side view in section of an energy supply chain according to the invention, more specifically viewing from the connection location indicated at A in FIG. 1 towards the radius identified at R in FIG. 1.

DESCRIPTION OF THE PREFERRED EMBODIMENT

Figure 1:
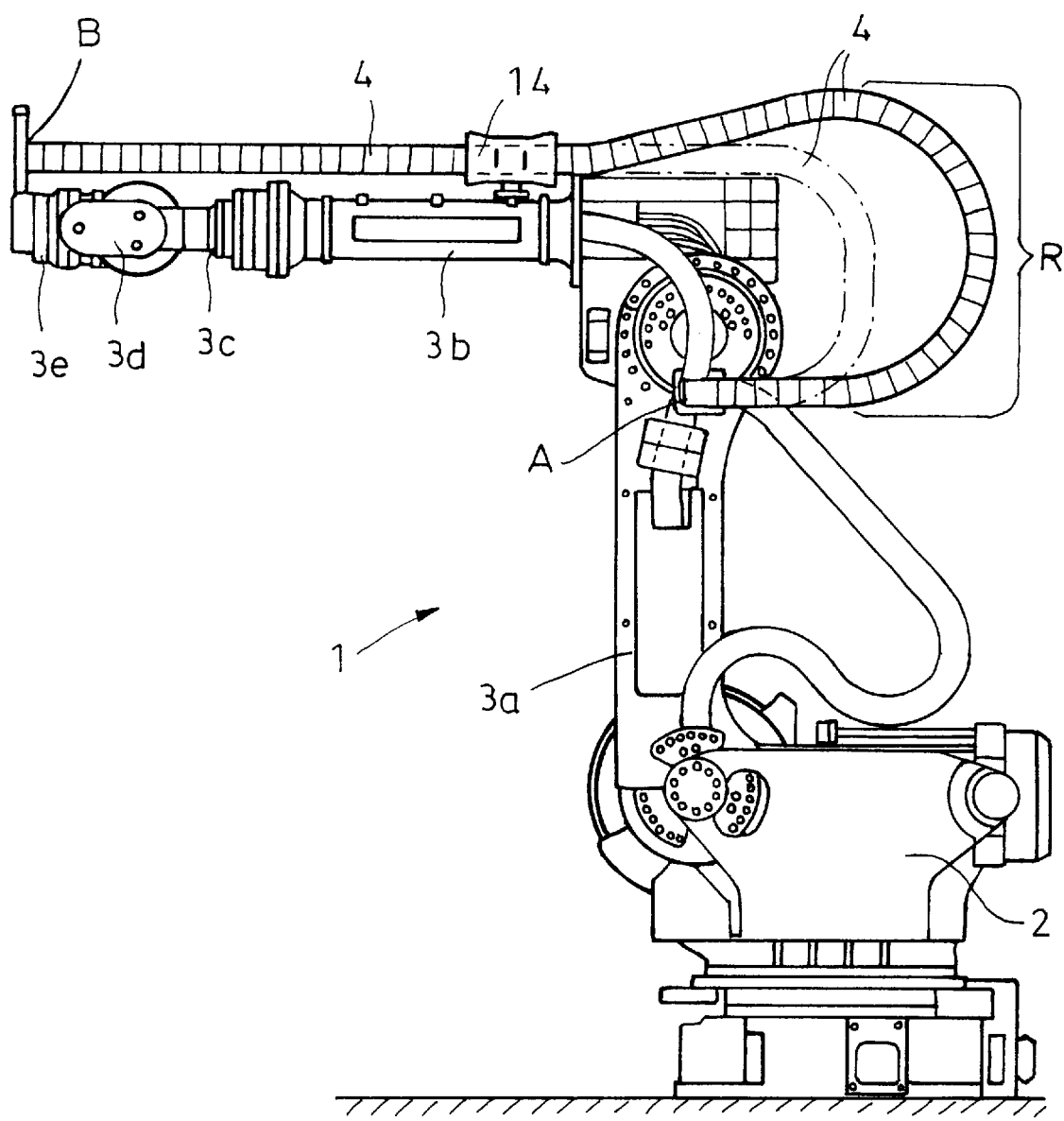
FIG. 1 is a view of a robot arm diagrammatically showing the configuration and arrangement of means for guiding conduits such as cables and/or hoses for supplying an application installation or tool which is not shown here.

Referring firstly to FIG. 1, indicated therein generally by reference numeral 1 is a robot having a support base 2 provided with a drive and actuating unit (not shown) and pivotal arms 3a, 3b, 3c, 3d, 3e which are suitably carried by the support base 2. The conduits such as cables and hoses for an application installation (not shown), for example a welding tongs tool or the like, at the distal end of the robot arm, are guided along the pivotal arms 3a through 3e from a lower connection location A to an upper connection location B at the distal end of the robot arm, in an energy supply chain which is indicated generally at 4 and which is movable in a total of three degrees of pivotal and/or rotational freedom.

The energy supply chain 4 is mounted rotatably about its longitudinal axis to the upper connection location B and is longitudinally slidably accommodated on the pivotal arm 3b by a mounting sleeve 14.

Figure 2:
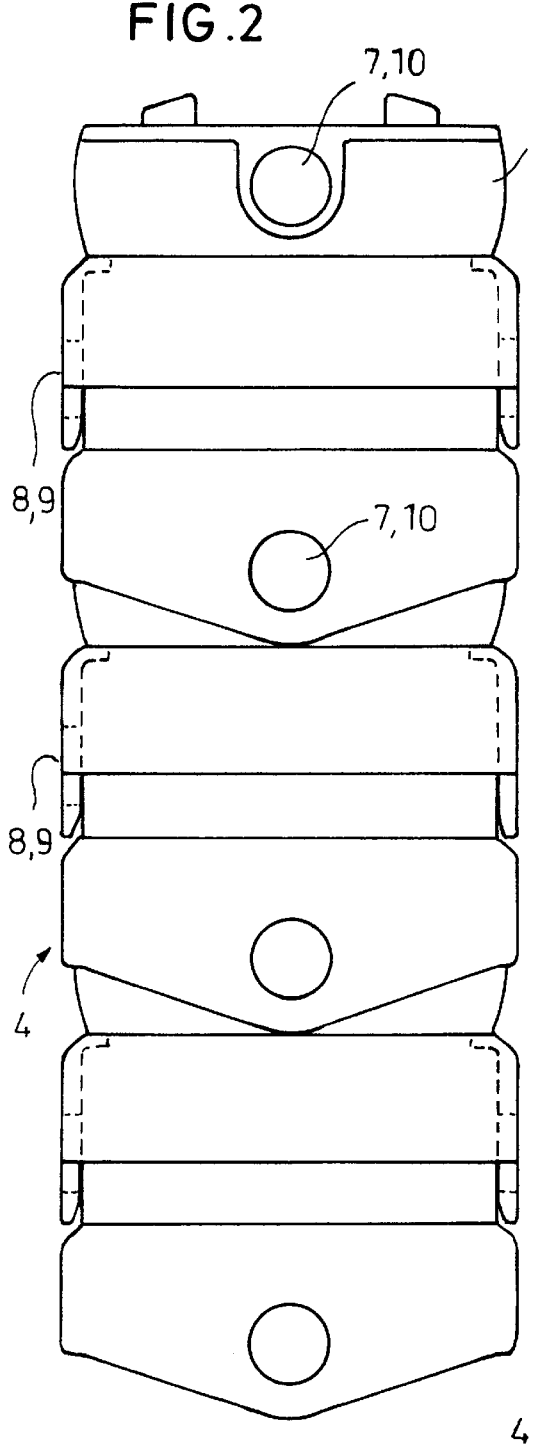
FIG. 2 shows a portion of an energy supply chain according to the invention, comprising six individual elements.
Figure 3:
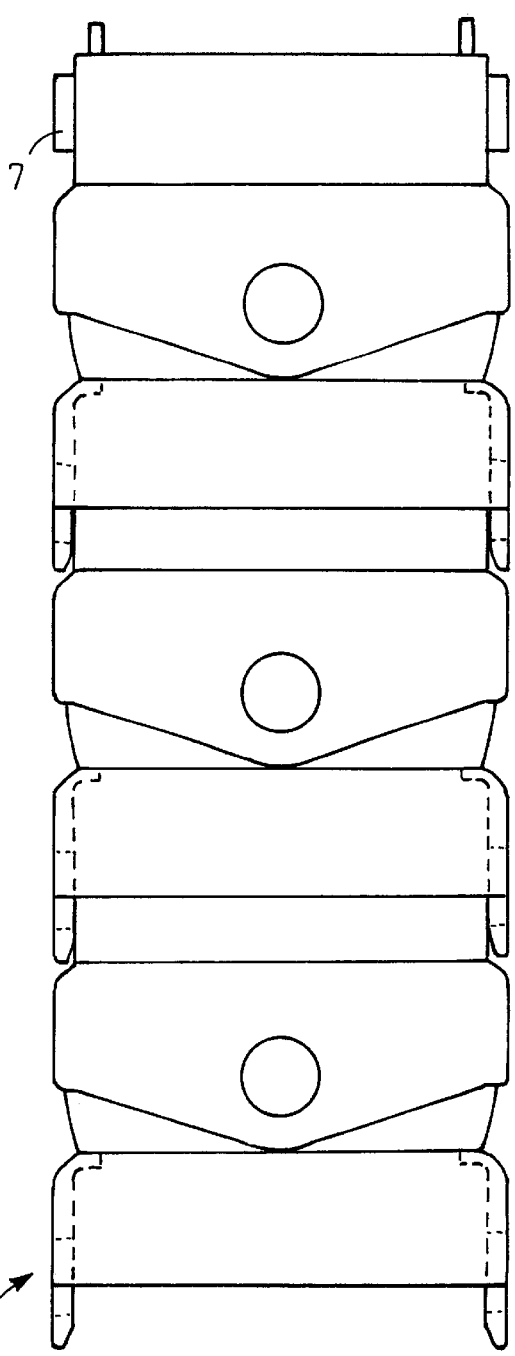
FIG. 3 shows a portion of the energy supply chain in FIG. 2, turned through 90°.
Figure 4:
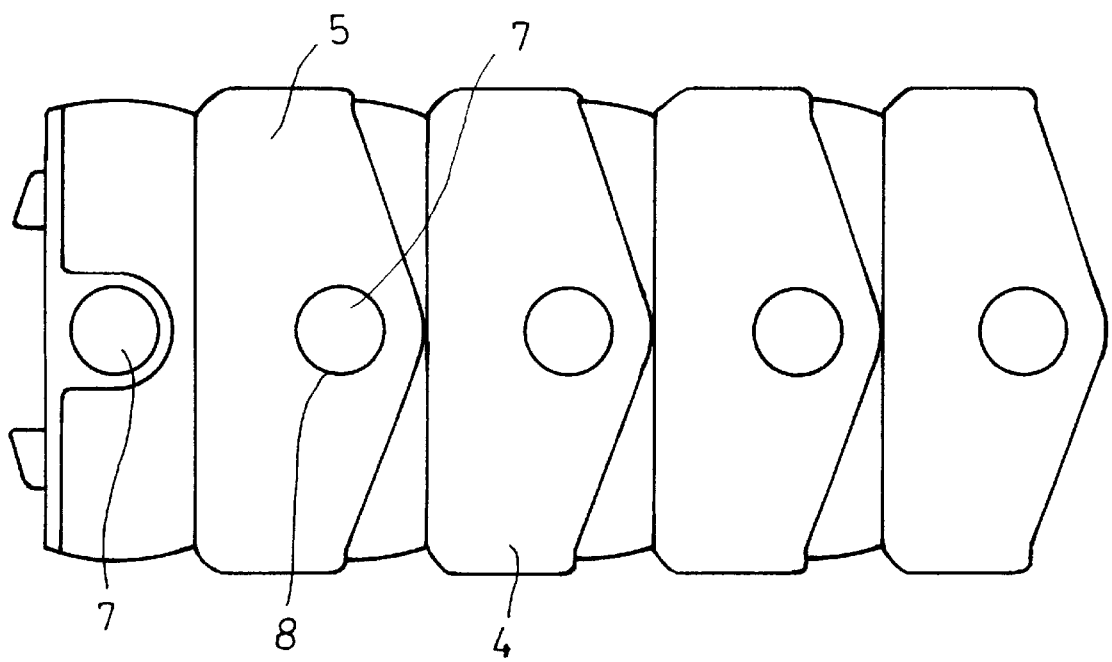
FIG. 4 shows a portion of an energy supply chain whose chain link members have only one degree of pivotal freedom relative to each other.

Reference will now be more specifically directed to FIGS. 2, 3 and 4 for a description of the energy supply chain 4. As can be seen therefrom, the energy supply chain 4 is formed from a plurality of chain link members 5 in the form of individual elements of for example a rectangular or square cross-sectional configuration. Each chain link member 5 encloses a hollow space 6 which is provided for receiving conduits such as cables and/or hoses. On their outside surfaces, the chain link members 5 each have two pins or projections as indicated at 7 in FIGS. 2 through 4 and two holes as indicated at 8 in FIGS. 2 and 4, wherein the holes 8 of a chain link member 5 define a first pivot axis indicated at 9 in FIG. 2 and the projections 7 of the same chain link member 5 define a second pivot axis indicated at 10 in FIG.

2. The holes 8 and the projections 7 are respectively arranged on opposite side surfaces of the chain link members 5 so that the two pivot axes 9 and 10 are arranged perpendicularly to each other and perpendicularly to the longitudinal axis of the elongate energy supply chain 4. The holes 8 are adapted in fitting relationship with the projections 7 so that the individual chain link members 5 of thermoplastic material can be fitted together to form a very substantially closed passage as the receiving space for the conduits.

The chain link members 5 of the portions of the energy supply chain 4, which are shown in FIGS. 2 and 3, therefore have two degrees of pivotal freedom relative to each other. In the portion of the energy supply chain 4 shown in FIG. 4, the chain link members 5 are of a different configuration. Here, the projections 7 and the holes 8 of a chain link member 5 are in such an orientation that the chain link members 5 only have relative to each other one degree of rotational freedom, with both a hole 8 and also a projection 7 being provided on a respective side of the chain link member 5.

Referring now back to FIG. 1, in the radius region of the energy supply chain 4, which is identified by R, the chain link members 5 have relative to each other only one respective degree of pivotal freedom, which is in the same direction, as is also illustrated in FIG. 4, while in the remaining portions of the chain the chain link members are of the design configuration shown in FIGS. 2 and 3.

Figure 5:
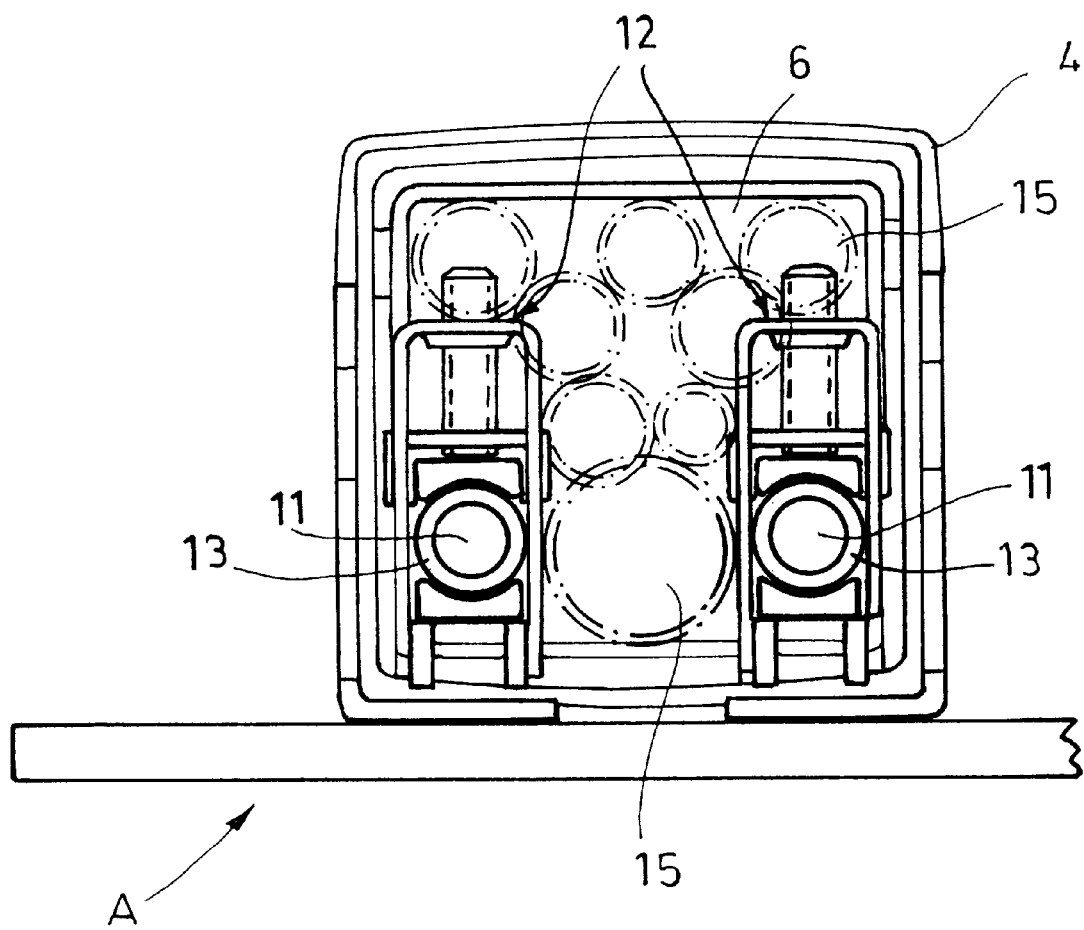
FIG. 5 shows a front view of an energy supply chain with hoses and cables therein, through which pass spring bars according to the invention, as viewed from a connection location of the chain.

Reference will be directed at this point to FIG. 6 showing the energy supply chain 4 from the lower connection location A into the radius region identified by R in FIG. 1, as a section therethrough. In that region the energy supply chain 4 is fitted with bars 11 of glass fiber which extend through the energy supply chain 4 and which are fixed to the lower connection location A, outside the energy supply chain 4, by fixing means illustrated in the form of clamping clips 12. The position of the clamping clips 12 can also be clearly seen from FIG. 5.

The bars 11 which may also comprise carbon fiber-reinforced glass fiber material or also just carbon fiber material are each fitted into respective guide tubes or hoses 13 which extend continuously from the lower connection location A to the upper connection location B and which are suitably fixed at the two connection locations A and B. The bars 11 which, as already mentioned above, are fixed only at the lower connection location A are so selected in terms of their length that they extend through the largest possible radius region R of the energy supply chain 4.

It will be readily seen that, in the event of a change in the distance between the lower connection location A and the upper connection location B, there may be a reduction in the radius of the region R, as is indicated by the thin broken lines in FIG. 1. In that case the position of the bars 11 changes, in relation to the chain link members 5 surrounding them.

It will also be apparent that by releasing the clamping clips 12, it is easily possible to adjust the length of the bars 11, which is the operative length in the radius region R.

It will be seen therefore that the at least one bar 11 which is accommodated in the plurality of pivotably interconnected chain link members in the receiving space for the conduit therein and which is resilient about its longitudinal axis, extending in the longitudinal direction of the chain, is operable to produce return forces, upon pivotal movement of the chain link members 5 relative to each other, with such return forces opposing the pivotal movement. When the energy supply chain adopts a curved configuration the bar is displaceable in the longitudinal direction at least in relation to some chain link members.

It will be appreciated that the bars 11 do not necessarily have to comprise glass fiber, for example they may also comprise spring steel. Reference numeral 15 in FIG. 5 denotes conduits such as hoses or cables which pass through the receiving space 6 in the energy supply chain 4, in which respect it will be appreciated that the nature and arrangement of the conduits in the energy supply chain may be adapted as desired.

The use of an energy supply chain according to the invention as set forth in hereinbefore as a means for guiding cables and/or hoses or like conduits has the advantage that they are afforded optimum protection from excessive kinking and flexural loadings or torsional loadings. It is reliably possible to avoid exceeding the highest possible flexural radius of the cables and/or hoses by virtue of suitable pivotal movement-limiting abutments on the chain link members. In addition, stabilisation of the pivoting or flexural radii, by virtue of the bars arranged in the interior of the chain, affords the advantage that the arrangement for guiding the hoses and cables can be exchanged and replaced without manipulation operations and dismantling operations in terms of stabilisation devices installed on the robot arm on the exterior thereof.

It will be appreciated that the above-described embodiment of the invention has been set forth solely by way of example and illustration of the principles thereof and that various modifications and alterations may be made therein without thereby departing from the spirit and scope of the invention.

What is claimed is:

1. An energy supply chain for guiding at least one conduit between first and second relatively movable connection locations, comprising
    a plurality of chain link members which form a receiving space for the conduit,
    means pivotably interconnecting the chain link members to form the elongate chain,
    at least one elongate bar which is resilient about its longitudinal axis and which extends in the longitudinal direction of the chain in the receiving space thereof and which upon pivotal movement of the chain link members relative to each other produces return forces opposing the pivotal movement, and
    means arranging the bar displaceably in the longitudinal direction at least in relation to some chain link members when the chain adopts a curved configuration.

2. An energy supply chain as set forth in claim 1 including a guide tube in which the at least one bar is arranged.

3. An energy supply chain as set forth in claim 2 wherein the guide tube extends continuously between said connection locations of the energy supply chain.

4. An energy supply chain as set forth in claim 1 including means for fixing the at least one bar at a first end outside the chain.

5. An energy supply chain as set forth in claim 1 including an end fixing portion and means for fixing the at least one bar thereto at a first end.

6. An energy supply chain as set forth in claim 1 wherein the chain link members are each in the form of elements with a closed external contour and a closed external surface so that they form a very substantially closed passage as a receiving space for the conduit.

7. An energy supply chain for guiding at least one conduit between first and second relatively movable connection locations, comprising:

a plurality of chain link members which form a receiving space for the conduit;

means pivotably interconnecting the chain link members to form the elongate chain; and first and second elongate bars of glass fiber, which are resilient about their longitudinal axes and which extend at least over a part of the length of the chain in the receiving space thereof and which upon pivotal movement of the chain link members relative to each other produce return forces opposing the pivotal movement.

8. An energy supply chain as set forth in claim 7 including guide tubes in which the bars are each respectively arranged.

9. An energy supply chain as set forth in claim 8 wherein the guide tubes extend continuously between said connection locations of the energy supply chain.

10. An energy supply chain for guiding at least one conduit between first and second relatively movable connection locations, comprising a plurality of chain link members which form a receiving space for the conduit, means pivotably interconnecting the chain link members to form the elongate chain, at least one elongate bar which is resilient about its longitudinal axis and which extends in the longitudinal direction of the chain in the receiving space thereof and which upon pivotal movement of the chain link members relative to each other produces return forces opposing the pivotal movement, wherein at least in a portion-wise manner a plurality of chain link members which are in mutually adjacent relationship have relative to each other first and second degrees of pivotal freedom, and wherein the chain link members at least in the region through which the at least one bar passes have only one degree of pivotal freedom relative to each other, which is in the respective same direction.

11. An energy supply chain as set forth in claim 10 wherein the pivot axes of said adjacent chain link members are oriented displaced through 90° relative to each other.

* * * * *